US012169865B2

(12) United States Patent
Wolfe

(10) Patent No.: US 12,169,865 B2
(45) Date of Patent: *Dec. 17, 2024

(54) SYSTEM AND METHOD FOR LOCALIZED PREPAID GIFT ACCOUNT PROGRAM UTILIZING OPEN LOOP NETWORK SYSTEMS WITH LOCAL MERCHANT APPROVAL AND BRANDING

(71) Applicant: Blackhawk Network, Inc.

(72) Inventor: Jason Wolfe, Sewickley, PA (US)

(73) Assignee: Blackhawk Network, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,469

(22) Filed: Jun. 12, 2023

(65) Prior Publication Data
US 2023/0325913 A1 Oct. 12, 2023

Related U.S. Application Data

(63) Continuation of application No. 16/890,206, filed on Jun. 2, 2020, now Pat. No. 11,715,152, which is a
(Continued)

(51) Int. Cl.
*G06Q 40/00* (2023.01)
(52) U.S. Cl.
CPC .................... *G06Q 40/00* (2013.01)
(58) Field of Classification Search
CPC ....................................................... G06Q 40/00
(Continued)

(56) References Cited

U.S. PATENT DOCUMENTS

| 4,809,837 A | 3/1989 | Hayashi |
| 7,424,452 B2 | 9/2008 | Feilbogen et al. |

(Continued)

FOREIGN PATENT DOCUMENTS

WO 2008013945 A2 1/2008

OTHER PUBLICATIONS

Cowlett, Mary, "Distribution breaks out of gift-card loop", Marketing : 47, Haymarket Business Publications Ltd., (Year: Mar. 10, 2010).*
(Continued)

*Primary Examiner* — Frantzy Poinvil
(74) *Attorney, Agent, or Firm* — Barnes & Thornburg LLP; Jerry C. Harris, Jr.

(57) ABSTRACT

Systems, methods, and computer-readable storage media for creating an open loop prepaid gift account. The system identifies a request to purchase an open loop prepaid gift account which can be used to make a purchase at a merchant, presents a menu from which a customer can select the merchant, and receives a selection. Based on the selection, the system presents an option to load funds onto the open loop prepaid gift account and, upon receipt of payment, creates the open loop prepaid gift account and loads the open loop prepaid gift account with money, wherein information associated with the open loop prepaid gift account is encoded onto a physical card, and wherein merchant information is printed on the physical card according to an authorization from the merchant, the merchant information including at least one of a legal name, a trade name, a logotype, and a marketing tagline of the merchant.

23 Claims, 4 Drawing Sheets

Related U.S. Application Data continuation of application No. 13/668,971, filed on Nov. 5, 2012, now Pat. No. 10,706,464.

(60) Provisional application No. 61/624,065, filed on Apr. 13, 2012.

(58) Field of Classification Search
USPC .................................................. 705/3–44
See application file for complete search history.

(56) References Cited

U.S. PATENT DOCUMENTS

| | | | |
|---|---|---|---|
| 7,494,048 | B2 | 2/2009 | Gusler et al. |
| 7,527,192 | B1 | 5/2009 | Chaskin et al. |
| 7,624,921 | B1 | 12/2009 | Beck et al. |
| 8,152,060 | B2 | 4/2012 | Wolfe et al. |
| 8,152,061 | B2 | 4/2012 | Wolfe et al. |
| 8,191,776 | B2 | 6/2012 | Ben-Zvi et al. |
| 8,229,851 | B2 | 7/2012 | Poran et al. |
| 8,285,643 | B2 | 10/2012 | Isaacson et al. |
| 8,401,957 | B2 | 3/2013 | Forlai |
| 8,463,661 | B2 | 6/2013 | Blair et al. |
| 8,464,938 | B2 | 6/2013 | Briscoe et al. |
| 8,528,814 | B2 | 9/2013 | Wolfe |
| 8,701,991 | B2 | 4/2014 | Wolfe |
| 8,773,637 | B2 | 7/2014 | Van De Kerkhof et al. |
| 9,016,567 | B2 | 4/2015 | Wolfe |
| 9,064,268 | B2 | 6/2015 | Larrick et al. |
| 9,324,110 | B2 | 4/2016 | Wolfe et al. |
| 9,767,442 | B2 * | 9/2017 | Killian ................. G06Q 20/40 |
| 2001/0007098 | A1 | 7/2001 | Hinrichs et al. |
| 2002/0046255 | A1 | 4/2002 | Moore et al. |
| 2002/0065713 | A1 | 5/2002 | Awada et al. |
| 2003/0004828 | A1 | 1/2003 | Epstein |
| 2004/0078325 | A1 | 4/2004 | O'Connor |
| 2004/0219971 | A1 | 11/2004 | Ciancio et al. |
| 2005/0038714 | A1 | 2/2005 | Bonet et al. |
| 2005/0171902 | A1 | 8/2005 | Nguyen |
| 2005/0177493 | A1 | 8/2005 | Sung |
| 2005/0228717 | A1 | 10/2005 | Gusler et al. |
| 2006/0037835 | A1 | 2/2006 | Doran et al. |
| 2006/0190337 | A1 | 8/2006 | Ayers, Jr. et al. |
| 2006/0190347 | A1 | 8/2006 | Cuervo |
| 2007/0055568 | A1 | 3/2007 | Osborne |
| 2007/0075134 | A1 * | 4/2007 | Perlow ................. G06Q 30/06 |
| | | | 235/380 |
| 2007/0156513 | A1 | 7/2007 | Mastrianni et al. |
| 2007/0205269 | A1 | 9/2007 | Lindon |
| 2007/0272736 | A1 | 11/2007 | Brooks et al. |
| 2007/0284433 | A1 | 12/2007 | Domenica et al. |
| 2008/0027810 | A1 | 1/2008 | Lerner et al. |
| 2008/0162271 | A1 | 7/2008 | Benjamin |
| 2008/0162299 | A1 | 7/2008 | Gusler et al. |
| 2008/0208688 | A1 | 8/2008 | Byerley et al. |
| 2008/0294518 | A1 | 11/2008 | Weiss et al. |
| 2008/0296368 | A1 | 12/2008 | Newsom |
| 2009/0030789 | A1 | 1/2009 | Mashinsky |
| 2009/0074167 | A1 | 3/2009 | Evans et al. |
| 2009/0171773 | A1 | 7/2009 | Shastry |
| 2009/0254484 | A1 | 10/2009 | Forero et al. |
| 2009/0265269 | A1 | 10/2009 | Stoecker |
| 2010/0010888 | A1 | 1/2010 | Maertz |
| 2010/0057580 | A1 | 3/2010 | Raghunathan |
| 2010/0070290 | A1 | 3/2010 | Marturana et al. |
| 2010/0076833 | A1 | 3/2010 | Nelsen |
| 2010/0078476 | A1 * | 4/2010 | Ben-Zvi ............... G06Q 20/349 |
| | | | 235/380 |
| 2010/0198726 | A1 | 8/2010 | Doran et al. |
| 2010/0280921 | A1 | 11/2010 | Stone et al. |
| 2010/0299194 | A1 | 11/2010 | Snyder et al. |
| 2010/0318415 | A1 | 12/2010 | Gottlieb |
| 2011/0079644 | A1 | 4/2011 | Wolfe et al. |
| 2011/0099104 | A1 | 4/2011 | Nybom |
| 2011/0106698 | A1 | 5/2011 | Isaacson et al. |
| 2011/0178862 | A1 | 7/2011 | Daigle |
| 2011/0178924 | A1 | 7/2011 | Briscoe et al. |
| 2011/0213674 | A2 | 9/2011 | Shpun et al. |
| 2011/0215139 | A1 | 9/2011 | Herold et al. |
| 2011/0288978 | A1 | 11/2011 | Abifaker |
| 2011/0295705 | A1 | 12/2011 | Kasmei |
| 2012/0016725 | A1 | 1/2012 | Kraft et al. |
| 2012/0031545 | A1 * | 2/2012 | Vaccaro .................... G09F 3/10 |
| | | | 156/387 |
| 2012/0066043 | A1 | 3/2012 | Carmichael et al. |
| 2012/0072298 | A1 | 3/2012 | Ramanujam et al. |
| 2012/0073388 | A1 | 3/2012 | Chibante |
| 2012/0123832 | A1 | 5/2012 | Nicolaidis et al. |
| 2012/0123833 | A1 | 5/2012 | Nicolaidis et al. |
| 2012/0123834 | A1 | 5/2012 | Nicolaidis et al. |
| 2012/0123922 | A1 | 5/2012 | Nicolaidis et al. |
| 2012/0123923 | A1 | 5/2012 | Nicolaidis et al. |
| 2012/0150643 | A1 | 6/2012 | Wolfe et al. |
| 2012/0246019 | A1 | 9/2012 | Wolfe |
| 2012/0284035 | A1 * | 11/2012 | Gillin ................. G06Q 30/0207 |
| | | | 705/1.1 |
| 2012/0303425 | A1 | 11/2012 | Katzin et al. |
| 2013/0036048 | A1 * | 2/2013 | Campos ................. G06Q 20/40 |
| | | | 705/41 |
| 2013/0073459 | A1 | 3/2013 | Zacarias et al. |
| 2013/0197986 | A1 | 8/2013 | Roberts et al. |
| 2013/0204681 | A1 | 8/2013 | Kraft et al. |
| 2013/0254074 | A1 | 9/2013 | Joa et al. |
| 2013/0254086 | A1 | 9/2013 | Joa et al. |
| 2013/0268413 | A1 | 10/2013 | Burr et al. |
| 2013/0284805 | A1 | 10/2013 | Kraft et al. |
| 2013/0341408 | A1 | 12/2013 | Pyhrr et al. |
| 2014/0006129 | A1 | 1/2014 | Heath |
| 2014/0012640 | A1 | 1/2014 | Roberts et al. |
| 2014/0046737 | A1 * | 2/2014 | Graves ............... G06Q 20/4037 |
| | | | 705/13 |
| 2014/0058934 | A1 | 2/2014 | Smith et al. |
| 2014/0081852 | A1 | 3/2014 | Blackhurst et al. |
| 2014/0101044 | A1 | 4/2014 | Blackhurst et al. |
| 2014/0114842 | A1 | 4/2014 | Blackhurst et al. |
| 2014/0195425 | A1 | 7/2014 | Campos et al. |
| 2014/0229319 | A1 | 8/2014 | Roberts et al. |
| 2014/0344149 | A1 * | 11/2014 | Campos ............. G06Q 20/3674 |
| | | | 705/41 |
| 2015/0213438 | A1 * | 7/2015 | Kramer ............. G06Q 30/0207 |
| | | | 705/14.4 |
| 2015/0213441 | A1 | 7/2015 | Wilen et al. |
| 2015/0254707 | A1 | 9/2015 | Larrick et al. |
| 2015/0269553 | A1 | 9/2015 | Barrett |
| 2015/0269561 | A1 | 9/2015 | Barrett |
| 2015/0278801 | A1 | 10/2015 | Friedlander |
| 2016/0012465 | A1 * | 1/2016 | Sharp .................... G06Q 20/321 |
| | | | 705/14.17 |
| 2016/0086166 | A1 * | 3/2016 | Pomeroy ........... G06Q 20/3674 |
| | | | 705/40 |

OTHER PUBLICATIONS

Murdoch, Scot, "Citi muscles in on the prepaid card club", The Australian (Canberra, A.C.T), (Year: Mar. 4, 2010).*

Torres, Blanca, "Shoppers Warm To Holiday Gift Card Concept", Oakland Tribune, Oakland Carlifornia, Dec. 12, 2007, 4 pages.

Mont, Joe, "Coming Soon: New Rules on Prepaid Debit Cards", Compliance Week, London, vol. 10, Iss. 109, Feb. 2013, pp. 14-15, 63.

Swapagift, "Swapagift.com Expands its "Cash for Your Card" Program", https://www.prweb.com/releases/2003/12/prweb96305.htm, Nov. 9, 2011, 2 pages.

Swapathing, Inc. "Swapathing Announces The Internet's First Online Gift Card Exchange", https://www.prweb.com/releases/2003/10/prweb83758.htm, Nov. 9, 2011, 3 pages.

swapagift.com, "Swapagift.com Turns Unwanted Gift Cards Into Cash", www.swapagift.com, Nov. 9, 2011, 1 page.

swapagift.com, "What is Swapagift.com?", www.swapagift.com, Nov. 9, 2011, 1 page.

Offenberg, Jennifer Pate, "Markets Gift Cards", Journal of Economic Perspectives, vol. 21, No. 2, Spring 2007, pp. 227-238.

(56) References Cited

OTHER PUBLICATIONS

Enrstberger, Kathryn W., D. McDowell and J. Parris, "Impact of Closed-Loop Gift Card Promotions by Businesses", International Journal of Business and Social Research 2.6, 2012, pp. 190-197.
First Data Corporation, "2010 U.S. Gift Card Consumer Insights Study", Mar. 2011, 88 pages.
Parker, Melley, "How To Use a TJMaxx Gift Card At Marshall's", https://www.sapling.com/8193750/use-maxx-gift-card-marshalls.com, 2011, 10 pages.
Cash for Your Card Now!, Retrieved from www.swapagift.com on Nov. 9, 2011.

\* cited by examiner

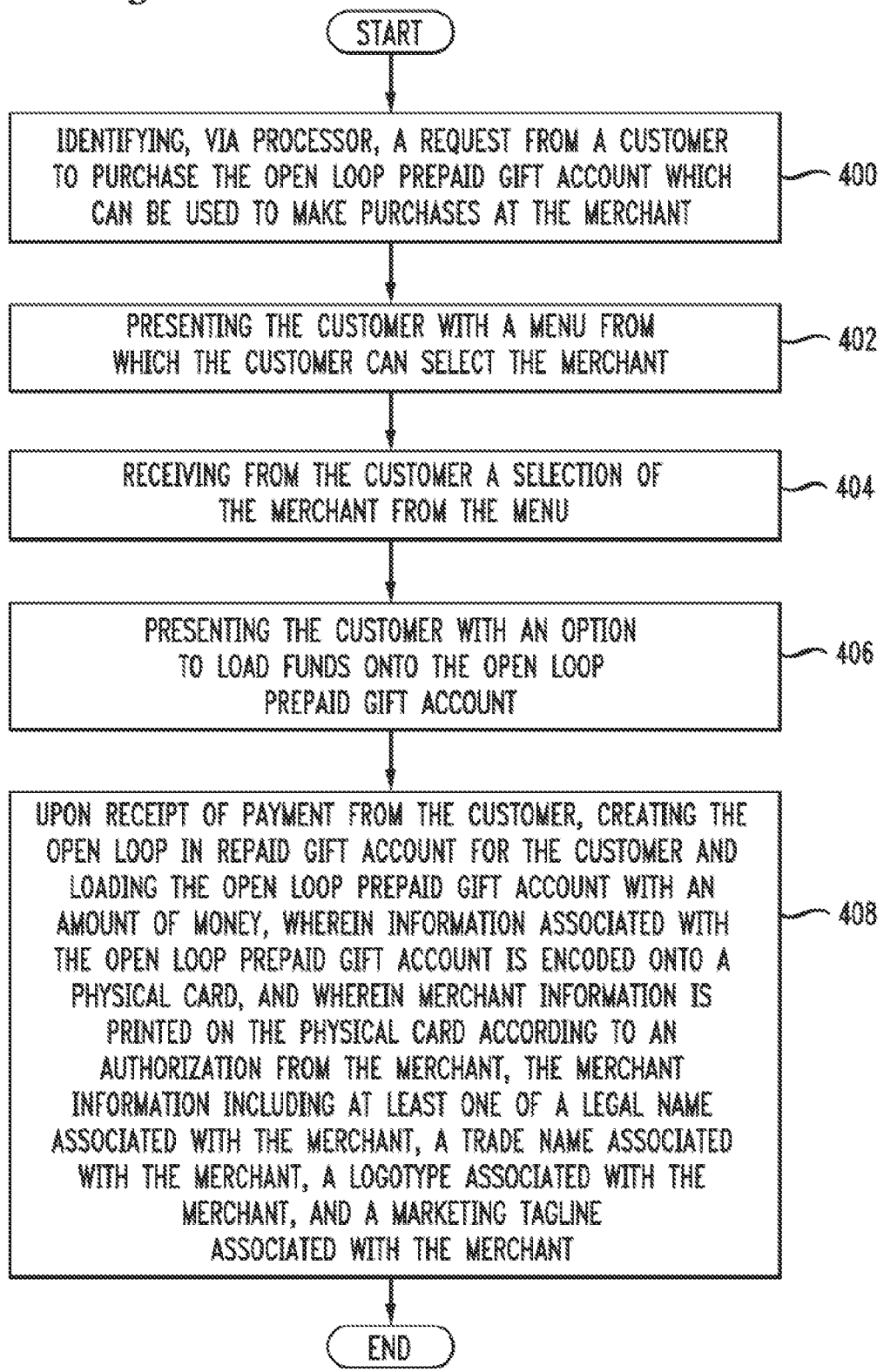

SYSTEM AND METHOD FOR LOCALIZED PREPAID GIFT ACCOUNT PROGRAM UTILIZING OPEN LOOP NETWORK SYSTEMS WITH LOCAL MERCHANT APPROVAL AND BRANDING

PRIORITY CLAIM

This application is a continuation application of, and claims priority to, U.S. patent application Ser. No. 16/890,206 filed on Jun. 2, 2020, which is a continuation application of, and claims priority to, U.S. patent application Ser. No. 13/668,971 filed on Nov. 5, 2012 and issued on Jul. 7, 2020 as U.S. Pat. No. 10,706,464, which claims priority to U.S. Provisional Application No. 61/624,065 filed on Apr. 13, 2012.

The present application claims priority to U.S. patent application Ser. No. 13/668,971 filed on Nov. 5, 2012 and Provisional Application 61/624,065, filed Apr. 13, 2012, all of which are herein incorporated by reference.

RELATED APPLICATIONS

The present application is related to U.S. patent application Ser. No. 17/734,285, filed on May 2, 2022 and U.S. patent application Ser. No. 13/668,923, filed on Nov. 5, 2012 and issued on Jun. 7, 2022 as U.S. Pat. No. 11,354,612, the contents of all are incorporated herein by reference.

BACKGROUND

1. Technical Field

The present disclosure relates to prepaid gift accounts and more specifically to creating an open loop prepaid gift account branded with merchant information and which can be used to make purchases at the merchant without changes to the merchant's existing point of sale system.

2. Introduction

Prepaid gift accounts are widely used as gifts for birthdays, Christmas, and other holidays. Prepaid gift accounts can be issued as physical cards. Prepaid gift accounts can also be issued as an account number delivered to the prepaid account holder via text message, email or as data displayed on an application residing on a mobile computing device such as a mobile telecommunications device, a mobile computing device such as a laptop computer, smart phone or tablet computer or a non-mobile computer device such as a personal computer system, personal gaming system or satellite or cable television system. Prepaid gift accounts can be closed loop, meaning that the value represented by the prepaid gift account is a valid form of payment at a particular retailer or a closed set of retailers. For example, an OUTBACK STEAKHOUSE® prepaid gift account is only redeemable at OUTBACK STEAKHOUSE® and not at PLANET HOLLYWOOD® or TARGET®. Some closed loop prepaid gift accounts are valid at a family of closely related or commonly owned merchants. For example, a DARDEN RESTAURANTS prepaid gift account is valid at RED LOBSTER® and OLIVE GARDEN®; similarly, a local mall prepaid gift account is valid at tenant merchants in the local mall. By contrast, prepaid gift accounts can also be open loop, such as VISA® or MASTERCARD® debit cards, which serve as a valid form of payment at virtually any retailer nationwide. According to one estimate, customers purchase about $100 billion worth of prepaid gift accounts annually in the U.S.

An issuer of a prepaid gift account is a financial institution (such as a national or state chartered bank or depository institution) which is a member of one of the payment association networks such as VISA®, MASTERCARD®, DISCOVER® and AMERICAN EXPRESS®. A prepaid gift account program manager is an individual or organization which assists a prepaid gift account issuer with the marketing, sale and management of the prepaid gift account program and may serve as an Independent Service Organization for one of the payment association networks such as VISA®, MASTERCARD®, DISCOVER® and AMERICAN EXPRESS®. Prepaid gift account program managers can also be authorized to manufacture prepaid gift account products by the one of the payment association networks such as VISA®, MASTERCARD®, DISCOVER® and AMERICAN EXPRESS®.

In the U.S., the majority of national retail merchants and service providers maintain closed loop prepaid gift account programs. However, due to the costs and complexity associated with creating and maintaining such programs, most local merchants are unable to offer any form of closed loop prepaid gift account program. Also, prepaid gift account issuers and program managers have virtually ignored the market for local merchant closed loop prepaid gift account programs failing to create such programs for local merchants due to the time, expense and effort involved in negotiating with the millions of small local merchants in the U.S. To date, prepaid gift account issuers and program managers have focused their efforts on creating closed loop prepaid gift account programs for larger national retailers and service providers. Thus, while many customers desire to purchase prepaid gift accounts for local merchants to give as gift to friends and family, customers are unable to do so. Also, while many local merchants desire to offer a closed loop prepaid gift account program for customers, due to the cost, expense and complexities of creating, offering and maintaining such a program, such local merchants are unable to do so.

Merchants who are able to offer closed loop prepaid gift account programs have a distinct advantages over merchants who are unable to offer a prepaid gift account program. Specifically, merchants with closed loop prepaid gift account programs often experience a marked increase in sales and revenues, new customer acquisitions and positive brand exposure. If such local merchants were able to offer a form of prepaid gift account program, such local merchants could clearly enjoy the same benefits as their larger, well-capitalized national retail competitors.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can provide a secure and efficient mechanism for creation of a prepaid gift account program for merchants. More specifically, these approaches allow merchants to offer a prepaid gift account program without the burden of implementing extensive operational changes and upfront costs associated therewith. Accordingly, a customer can have the option to purchase a prepaid gift account product for the merchants of their choice.

Disclosed herein are systems, methods, and computer-readable storage media for creating an open loop prepaid gift account encoded onto a physical card, wherein the legal name, trade name and/or logotype of the merchant is printed on the physical card with the authorization of the merchant. The system identifies a request from a customer to purchase an open loop prepaid gift account which can be used to make a purchase at a merchant, and presents the customer with a menu from which the customer can select the merchant. The system then receives from the customer a selection of the merchant from the menu and, based on the selection of the merchant, presents the customer with an option to load funds onto the open loop prepaid gift account. Upon receipt of payment from the customer, the system creates the open loop prepaid gift account for the customer and loads the open loop prepaid gift account with an amount of money, wherein information associated with the open loop prepaid gift account is encoded onto a physical card, and wherein merchant information is printed on the physical card according to an authorization from the merchant, the merchant information comprising at least one of a legal name associated with the merchant, a trade name associated with the merchant, a logotype associated with the merchant, and a marketing tagline associated with the merchant.

The merchant can include, for example, a local merchant, a small business, a new business, a national merchant, an internet merchant, etc. The cardholder can use the physical card to make purchases at a merchant selected by the customer. Here, a prepaid gift account issuer and/or program manager can create a prepaid gift account for any local merchant, as requested by a particular customer. Moreover, the open loop prepaid gift account can be branded by a payment network association. The selection of the merchant can be based on a city associated with the merchant, a state associated with the merchant, a geographic region associated with the merchant, a metropolitan area associated with the merchant, and any other information associated with the merchant, the customer, the prepaid gift account, and so forth.

In one embodiment, the merchant pays a commission to one a prepaid gift account issuer and/or a program manager based on a percentage of gross purchases made by the open loop prepaid gift account at the merchant. In another embodiment, the merchant pays a commission to a prepaid gift account issuer and/or a program manager for the merchant's name appearing first on a list of search results in response to a search by the customer for a particular category of merchant.

A prepaid gift account issuer or program manager can create a prepaid gift account for a merchant, such as a local merchant, without subjecting the merchant to the significant costs of creating, offering and/or maintaining a traditional closed loop prepaid gift account program. A customer simply selects the merchant for which the customer desires a prepaid gift account and the system creates the prepaid gift account product for the customer. The prepaid gift account can be branded by a payment association networks such as VISA®, MASTERCARD®, DISCOVER® or AMERICAN EXPRESS®, as the majority of local merchants have already agreed to accept these payment association network branded prepaid gift accounts. Thus, merchants will be able to accept these physical cards without incurring the expense of having to purchase additional equipment or computer software or making any operational or system changes. The merchant can simply use their existing point of sale (POS) system to accept the open loop prepaid card.

In one embodiment, the system identifies a request from a customer to purchase a prepaid gift account for a type of merchant based a particular city, state, metropolitan area and/or geographic area. For example, a customer may use a displayed menu to search for and select a pizza restaurant in the Pittsburgh, Pennsylvania. The system would then display all pizza restaurants located in the Pittsburgh, Pennsylvania. The customer would make a selection of a particular pizza restaurant in Pittsburgh, Pennsylvania. For example, the customer could select Steel City Pizza located in Pittsburgh, Pennsylvania.

The system prompts the customer to enter the amount of money which the customer desires to load onto the prepaid gift account for Steel City Pizza. The customer inputs such amount into the system. The system then presents the purchase price to the customer for the creation of an open loop prepaid gift account encoded onto a physical card and loaded with the denomination requested by the customer. The customer would then be prompted to pay for the purchase via credit card, debit card, PAYPAL account, ACH transfer, and/or prepaid gift account, for example.

Following receipt of payment from the customer, the system creates and delivers to the purchaser an open loop prepaid gift account branded with a payment network associations (such as VISA®, MASTERCARD®, DISCOVER® OR AMERICAN EXPRESS®) for the customer, in the denomination requested and encode such prepaid gift account on a physical card. The system prints on the face of the physical card a legal name, a trade name, a logotype, and/or a marketing tagline of the merchant. For example, the system can print the following on the physical card for Steel City Pizza: "STEEL CITY PIZZA." The legal name, trade name or logotype of the local merchant can also be printed on the card carrier and/or a customizable greeting card sent with the physical card. The prepaid gift account can be delivered via U.S. Mail or other delivery service (such as Federal Express® or UPS®). Thus, the merchant has a prepaid gift account product offering for its customers without incurring the expense of having to purchase additional equipment or computer software and by simply using their existing POS terminal to accept the open loop prepaid card.

In an alternative embodiment, in exchange for the creation and/or management of the open loop prepaid gift account program, the merchant pays the prepaid gift account issuer and/or program provider a commission equal to a percentage of the gross purchases made using the prepaid gift account at such merchant. For example, if Steel City Pizza authorized the creation of a Steel City Pizza an open loop prepaid gift account program, Steel City Pizza would pay to the prepaid gift account program manager who created the program a commission equal to ten percent (10%) of the gross amount of purchases made at Steel City Pizza with the open loop prepaid gift accounts. In another embodiment, the merchant pays a commission to cause such merchant's name to appear first on a list of search results in response to a search by customer for a particular type or category of local merchants located in a city, state, geographic region and/or metropolitan areas. For example, for a commission of five percent (5%), Steel City Pizza would appear first on the list of local merchants displayed when a customer searches for a pizza restaurant located in Pittsburgh, Pennsylvania. The merchant could also offer coupons and additional discounts or rebates to customers who used the prepaid gift accounts to make purchases at such merchant.

BRIEF DESCRIPTION OF DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 4 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting form the spirit and scope of the disclosure.

The present disclosure addresses the need in the art for creating secure, efficient, and flexible prepaid gift account programs for merchants. A system, method and non-transitory computer-readable media are disclosed for creating an open loop prepaid gift account encoded onto a physical card, wherein the legal name, trade name and/or logotype of the merchant is printed on the physical card with the authorization of the merchant. A brief introductory description of a basic general purpose system or computing device in FIG. 1, which can be employed to practice the concepts, is disclosed herein. A more detailed description of creating an open loop prepaid gift account will then follow. Variations shall be discussed herein as the various embodiments are set forth. The disclosure now turns to FIG. 1.

Figure 1:
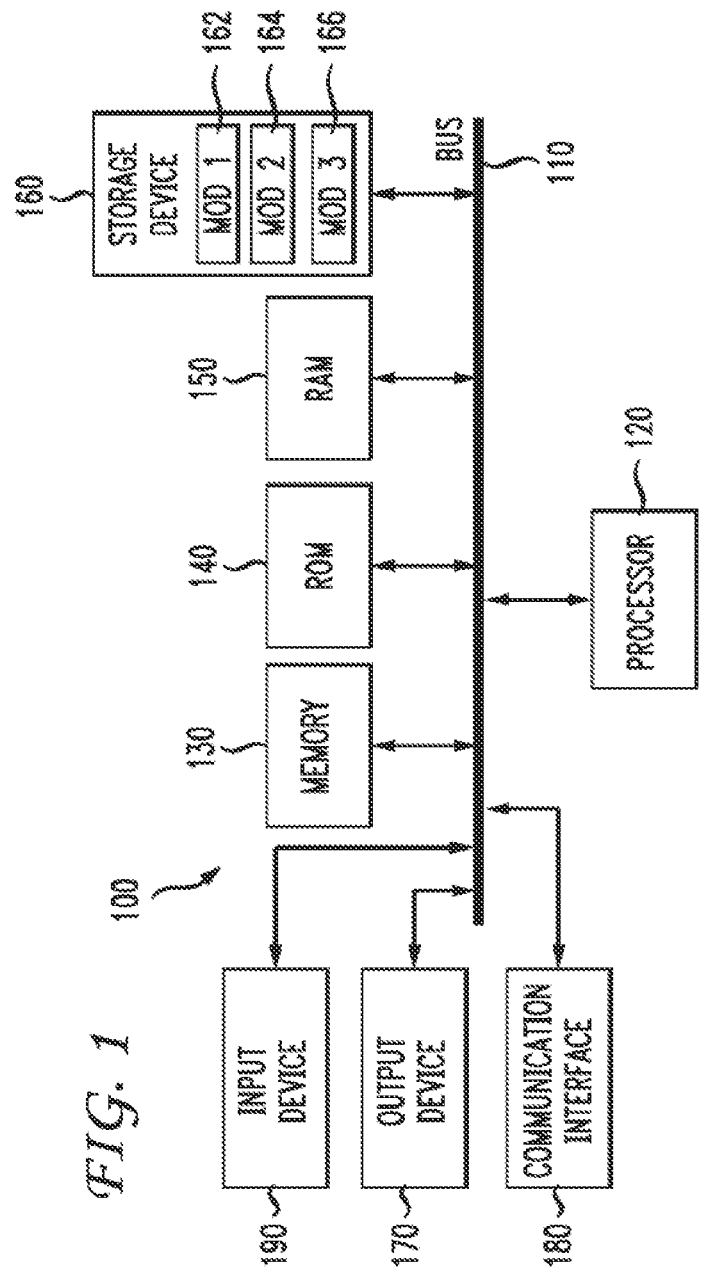
FIG. 1 illustrates an example system embodiment.

With reference to FIG. 1, an example system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the example embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the example operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
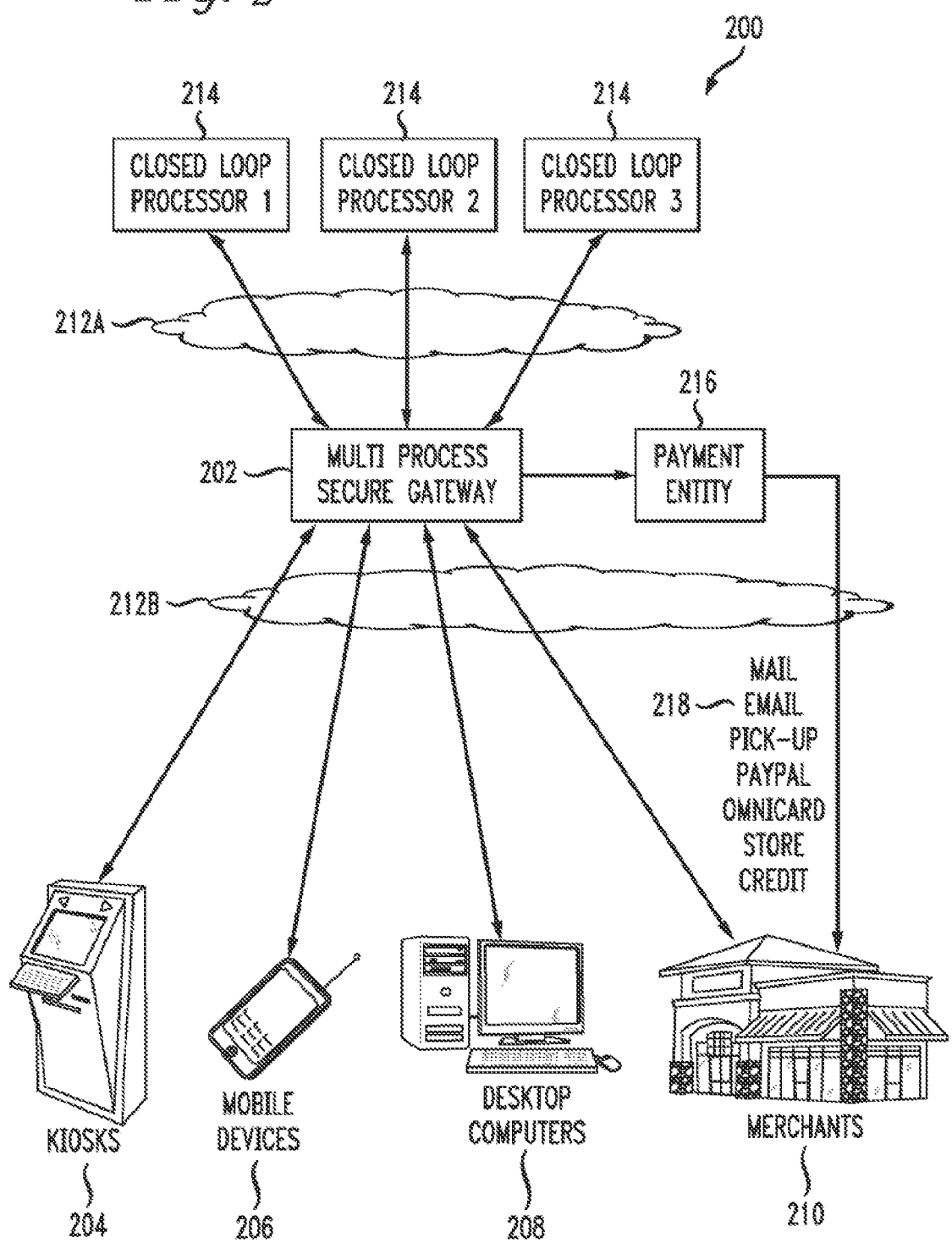
FIG. 2 illustrates an example of a multi-process secure gateway configuration.

Having disclosed some components of a computing system, the disclosure now turns to a discussion of creation of prepaid gift accounts for local merchants, followed by a description of the example multi-process secure gateway configuration shown in FIG. 2. A more detailed discussion of creating prepaid gift accounts for local merchants will then follow.

Prepaid gift accounts are divided into open loop and closed loop prepaid gifts. Typically issuing banks or credit card companies issue open loop prepaid gift accounts (example: VISA®, MASTERCARD®, AMERICAN EXPRESS® or DISCOVER®) which can be redeemed by virtually any business entity. These differ from closed loop prepaid gift accounts which are typically issued by a specific store or restaurant and can be only redeemed by the issuing provider (example: SEARS®, RED LOBSTER®, TARGET®). Prepaid gift accounts can be issued as open loop or closed loop physical cards or as an account number delivered to the prepaid account holder via text message, email or as data displayed on an application residing on a mobile computing device such as a mobile telecommunications device, a mobile computing device such as a laptop computer, smart phone or tablet computer or a non-mobile computer device such as a personal computer system, personal gaming system or satellite or cable television system. Prepaid gift accounts can be branded by one of the payment associations such as VISA®, MASTERCARD® or DISCOVER® or AMERICAN EXPRESS®. The prepaid gift accounts created by the prepaid gift account issuer or program manager using the system disclosed herein is an open loop, payment network association branded prepaid gift account.

The disclosure now turns to FIG. 2, which illustrates a multi-process secure gateway configuration 200. The multi-process secure gateway 202 can be implemented as a local or remote server, a group of tightly or loosely interconnected servers, integrated as a software module within a point of sale device, or as any other suitable device, software, or combination thereof. In FIG. 2, the multi-process secure gateway 202 is shown as a single conceptual server available over a network 212B, such as the public telephone network or the Internet. The principles set forth herein can be applied to local area networks, wide area networks, virtual private networks, intranets, home networks, corporate networks, wireless ad-hoc networks, peer-to-peer networks, and virtually any other form of network.

The multi-process secure gateway 202 interacts with various requesters, such as kiosks 204, mobile devices 206, desktop computers 208, and merchants' point of sale devices 210, which request information, submit information, and/or receive information associated with a prepaid gift account. For example, a requester can submit information uniquely identifying a prepaid gift account owned by the requester or another party. A requester can also submit a request to purchase an open loop prepaid gift account which can be used to make purchases at a merchant. The requester can submit a request to access information associated with merchants, such as a menu of merchants, and/or a selection of one or more merchants from the information associated with the merchants. The requester can also submit payment for one or more prepaid gift accounts, submit an offer to buy/sell a prepaid gift account, submit a request to transfer a prepaid gift account, and so forth.

In FIG. 2, mobile device 206 represents a standard telephone, as well as a communication with an interactive voice response system. The various devices 204-208 can include virtually any device with networking capabilities. Each of the devices 204-208 can interact with the secure gateway 202 through different protocols, such as a direct network connection, an HTTP-based portal, SMS messages, telephone, interactive voice response systems, point-of-sale (POS) terminals, browsers, plug-ins, Secure Shell, File Transfer Protocol, Internet Protocol, Simple Mail Transfer Protocol, Telnet, etc. Moreover, each of the devices 204-208 can communicate with the secure gateway 202 via the network 212B, which can include a public network such as the Internet, and/or a private network such as a local area network, a virtual private network, an intranet, a home network, a corporate network, etc.

In the case of merchants, each point-of-sale (POS) of the merchant 210 can connect to a centralized merchant server (not shown) which relays requests to the secure gateway 202 on behalf of all the merchant 210 point of sale devices. Other configurations also exist, as one of ordinary skill in the art will recognize. In one aspect, a process for generating gift cards may be called "Cash4Card" (name used for description purposes only). Merchants 210, kiosks 204, other devices and/or locations, including online storefronts, which provide an interface to the secure gateway 202 can provide an easily recognizable visual or other indication readily indicating to potential customers that they prepaid gift accounts under the Cash4Card program. The indication can be a window sticker, an online image, or other sign displayed in a manner similar to the well-known overlapping circles for MASTERCARD® or the blue and orange bars over and under the word VISA®.

The secure gateway 202 interacts with multiple closed loop processors 214, such as FIRSTDATA and CHASE PAYMENTECH, over a network 212A such as the Internet. These processors are entities that process prepaid gift account, such as FIRSTDATA, and can be different from a computer processor such as an AMD PHENOM II or INTEL CORE DUO. The secure gateway 202 can perform any action on a prepaid gift account through the various prepaid gift account processors 214 as if the secure gateway 202 was a merchant. The secure gateway 202 analyzes the submitted information to determine which closed loop processor handles that type of prepaid gift account. For example, a particular series of numbers or letters can indicate that one prepaid gift account is honored by PAYMENTECH, and another distinct set of numbers or letters indicates that another closed loop card/code is honored by FIRSTDATA. The logic and analysis in the secure gateway 202 can change from time to time as new types of prepaid gift account are issued by existing prepaid gift account processors 214 or as the secure gateway 202 adds interfaces for new prepaid gift account processors. The secure gateway 202 can include a common application programmer interface (API) which defines actions which may be performed through the prepaid gift account processors 214. The API translates API calls to the corresponding specific sets of proprietary interactions with the various closed loop processors 214, which may be very different between prepaid gift account processors 214.

The secure gateway 202 can identify a request from a customer to purchase an open loop prepaid gift account which can be used to make purchases at a merchant, and present the customer with a menu from which the customer can select the merchant. For example, the secure gateway 202 can present the customer with a menu by transmitting to the devices 204-208 instructions for displaying the menu. The secure gateway 202 can receive from the customer a selection of the merchant from the menu and, based on the selection of the merchant, present the customer with an option to load funds onto the open loop prepaid gift account. Upon receipt of payment from the customer, the secure gateway 202 can interact with the prepaid gift account processors 214 to create the open loop prepaid gift account for the customer and load the open loop prepaid gift account with an amount of money. The amount of money can be, for example, an amount requested by the customer. Information associated with the open loop prepaid gift account can be encoded onto a physical card. The physical card can also include merchant information, which can be printed on the physical card according to an authorization from the merchant. Merchant information can include a legal name associated with the merchant, a trade name associated with the merchant, a logotype associated with the merchant, a marketing tagline associated with the merchant, and other information associated with the merchant.

The secure gateway 202 and prepaid gift account processors 214 can create the open loop prepaid gift account for the merchant without the merchant's consent. Moreover, the secure gateway 202 and prepaid gift account processors 214 can create the open loop prepaid gift account for any merchant without having to obtain the merchant's consent to use the merchant's name on the open loop prepaid gift account product, which can be, for example, a physical card encoded with information regarding the prepaid gift account and containing the merchant's legal or trade name. The customer can simply select the merchant for which the customer desires an open loop prepaid gift account, and the secure gateway 202 and prepaid gift account processors 214 can create the open loop prepaid gift account product for the customer without the prior consent or authorization of the merchant.

The secure gateway 202 can determine the balance of a prepaid gift account, such as an open loop prepaid gift account, from the prepaid gift account processor 214. The secure gateway 202 can also offer to sell/purchase the prepaid gift account. If the requestor provides an indication of agreement to sell the prepaid gift account, then the secure gateway 202 can deactivate the prepaid gift account, issue a new prepaid gift account in an amount, and pay the purchase price to the requestor through a payment entity 216. The gateway 202 can also provide instructions to other entities to perform the deactivation, issuance, payment, and other steps. The payment entity 216 can be part of the secure gateway 202, part of a merchant point of sale equipment 210, or a separate entity altogether. The payment entity 216 can also be configured to receive payment from a requester for a prepaid gift account, such as an open loop prepaid gift account.

The secure gateway 202 can provide additional instructions regarding how to transfer payment 218 to the requestor and/or receive payment from the requestor. Some examples of how to transfer payment include mailing a check to the requestor, paying cash to the requestor, mailing a new prepaid gift account issued as a physical card to the requestor, texting, emailing or displaying on an application on a mobile or non-mobile computing device to the requestor the necessary information to use a non-physical prepaid gift account (such as an account number and PIN), notifying a local financial service to prepare an amount of money for pickup (such as MONEYGRAM or WESTERN UNION), transferring funds to an electronic account (such as PAYPAL), paying a bill of the requestor, transferring money to a requestor's existing credit card or debit card or granting store credit to the requestor. The payment entity 216 can also provide payment to the requestor using other suitable approaches.

In one embodiment, the secure gateway 202 receives a request from a customer for creating an open loop prepaid gift account for a merchant without the merchant's consent. The secure gateway 202 identifies the request to purchase the open loop prepaid gift account, which can be used to make purchases at the merchant, and presents the customer with a menu from which the customer can select the local merchant. The secure gateway 202 then receives from the customer a selection of the merchant from the menu. Based on the selection of the merchant, the secure gateway 202 presents the customer with an option to load a particular value of money onto the open loop prepaid gift account. Upon receipt of payment from the customer, the secure gateway 202 creates the open loop prepaid gift account for the customer with funds loaded in an amount requested by the customer. Here, information regarding the prepaid gift account can be encoded onto a physical card. The gateway 202 can print on the physical card a statement suggesting that the customer use the physical card to make purchases at the merchant selected by the customer. The gateway 202 can also print merchant information on the physical card, such as a legal name associated with the merchant, a trade name associated with the merchant, a logotype associated with the merchant, a marketing tagline associated with the merchant, and so forth. Moreover, the prepaid gift account can be branded by a payment network association.

In another embodiment, the secure gateway 202 identifies an prepaid gift account associated with a prepaid gift and determines the balance of the account from the prepaid gift account processor 214. The secure gateway 202 then presents the owner of the prepaid gift account with an offer to purchase the prepaid gift account for an offer amount, which can be equal to the balance, below the balance, or above the balance. If the secure gateway 202 receives an acceptance of the offer from the owner, the secure gateway 202 provides payment to the owner of at least a portion of the amount in the prepaid gift account, generates a new prepaid gift account for a new prepaid gift, transfers funds from the account to the new prepaid gift account, deactivates the first prepaid gift account, and offers the new prepaid gift account for resale as a new prepaid gift. The money funding the new prepaid gift account does not need to directly come from the first prepaid gift account. For example, if a user has $100 in prepaid gift account for OLIVE GARDEN and desires to sell that prepaid gift account because they would prefer money, the system may pay the person $90 for the prepaid gift account from the first prepaid gift account or a separate account, then transfer a portion of the money from the first prepaid gift account to the new account and close down the original prepaid gift account such that the person cannot commit fraud by using the first prepaid gift account after being paid for the first prepaid gift account. Suppose that the new prepaid gift account now has $90 in it. The new prepaid gift associated with that new prepaid gift account can then be sold and it could be for OLIVE GARDEN, another business, or may be a general open loop prepaid gift account. The secure gateway 202 can offer the new prepaid gift account for resale to any other person. Moreover, the secure gateway 202 can provide payment via the payment entity 216.

Figure 3:
FIG. 3 illustrates an example of a physical card encoded with information associated with a prepaid gift account created for a merchant.

FIG. 3 illustrates an example of a physical card 302 encoded with information associated with a prepaid gift account created for a local merchant. The physical card 302 includes a statement suggesting that the customer use the physical card to make purchases at the "Steel City Pizza," which is the merchant selected by the customer. The physical card 302 also includes the cardholder name, a code, and a date. The code can be, for example, a code identifying the prepaid gift account, the merchant, a bank, the prepaid gift account program, etc. The date can include the issued date, an expiration date, and so forth. The physical card 302 also includes a message, which can be any generic message and/or a message customized for the customer, the prepaid gift account, the merchant, the prepaid gift account program, and/or any third party. They physical card 302 can also include additional information, including symbols, images, bar codes, text, and any other form of information. Moreover, the physical card 302 can include merchant information, such as a legal name associated with the merchant, a trade name associated with the merchant, a logotype associated with the merchant, a marketing tagline associated with the merchant, and so forth. The merchant information can be printed on the physical card according to an authorization from the merchant. Moreover, the prepaid gift account can be branded by a payment network association.

The code and any information associated with the prepaid gift account can be encoded onto the physical card 302. The information encoded onto the physical card 302 can be used to identify, process, and/or describe the physical card 302 and the prepaid account. The information can be read by a card reader, a scanner, etc. For example, the prepaid gift account owner can insert the physical card 302 into a card reader within a kiosk in a manner similar to an Automated Teller Machine (ATM). The prepaid gift account owner can also enter the account number associated with the prepaid gift account into a POS terminal, an application on a mobile computing device or a personal computer which transmits the account number to the secure gateway 202 via a network.

Having disclosed some basic system components and concepts, the disclosure now turns to the example method embodiment shown in FIG. 4. For the sake of clarity, the method is discussed in terms of an example system 100, as shown in FIG. 1, configured to practice the method. The steps outlined herein are examples and can be implemented in any combination thereof, including combinations that exclude, add, or modify certain steps.

FIG. 4 illustrates an example method embodiment for creating an open loop prepaid gift account program for merchants branded with the merchant's legal name, trade name, logotype and/or marketing tagline. The method can be practiced, for example, by a system 100, as shown in FIG. 1, a computer cluster, a server farm, or any other multi node configuration. The system can create a prepaid gift program for merchants at no additional cost to the merchant and without the merchant incurring the expense of having to purchase additional equipment and/or computer software, and by simply using their existing Point-of-Sale (POS) terminal to accept the physical card.

The system 100 first identifies a request from a customer to purchase an open loop prepaid gift account which can be used to make a purchase at a merchant (400), and presents the customer with a menu from which the customer can select the merchant (402). The system 100 then receives from the customer a selection of the merchant from the menu (404) and, based on the selection of the merchant, presents the customer with an option to load funds onto the open loop prepaid gift account (406). Upon receipt of payment from the customer, the system 100 creates the open loop prepaid gift account for the customer and loads the open loop prepaid gift account with an amount of money, wherein information associated with the open loop prepaid gift account is encoded onto a physical card, and wherein merchant information is printed on the physical card according to an authorization from the merchant, the merchant information including at least one of a legal name associated with the merchant, a trade name associated with the merchant, a logotype associated with the merchant, and a marketing tagline associated with the merchant (408).

The merchant can include, for example, a local merchant, a small business, a new business, a national merchant, an internet merchant, etc. The cardholder can use the physical card to make purchases at a merchant selected by the customer. Here, a prepaid gift account issuer and/or program manager can create a prepaid gift account for any local merchant, as requested by a particular customer. Moreover, the open loop prepaid gift account can be branded by a payment network association. The selection of the merchant can be based on a city associated with the merchant, a state associated with the merchant, a geographic region associated with the merchant, a metropolitan area associated with the merchant, and any other information associated with the merchant, the customer, the prepaid gift account, and so forth.

In one embodiment, the merchant pays a commission to one a prepaid gift account issuer and/or a program manager based on a percentage of gross purchases made by the open loop prepaid gift account at the merchant. In another embodiment, the merchant pays a commission to a prepaid gift account issuer and/or a program manager for the merchant's name appearing first on a list of search results in response to a search by the customer for a particular category of merchant.

Here, a prepaid gift account issuer or program manager can create the prepaid gift account for a merchant, such as a local merchant, without subjecting the merchant to the significant costs of creating, offering and/or maintaining a traditional closed loop prepaid gift account program. A customer simply selects the merchant for which the customer desires a prepaid gift account and the system creates the prepaid gift account product for the customer. The prepaid gift account can be branded by a payment association networks such as VISA®, MASTERCARD®, DISCOVER® or AMERICAN EXPRESS®, as the majority of local merchants have already agreed to accept these payment association network branded prepaid gift accounts. Thus, merchants will be able to accept these physical cards without incurring the expense of having to purchase additional equipment or computer software or making any operational or system changes. The merchant can simply use their existing POS system to accept the open loop prepaid card.

In another embodiment, the system 100 first identifies a request from a customer to purchase an open loop prepaid gift account for use at a particular merchant based on one of a merchant's location in a city, state, metropolitan area and geographic area. For example, a customer may use the system 100 to display menus to search for a pizza restaurants in the Pittsburgh, Pennsylvania. The system 100 displays pizza restaurants located in the Pittsburgh, Pennsylvania allows the customer to make a selection of a particular pizza restaurant in Pittsburgh, Pennsylvania. For example, the customer can select "Steel City Pizza". The system 100 then prompts the customer to enter the amount of money which customer desires to load onto the prepaid gift account for Steel City Pizza. The system 100 then allows the customer to input such amount. The system 100 then presents the purchase price to customer for the creation of an open loop prepaid gift account encoded onto a physical card and loaded with the denomination requested by customer for Steel City Pizza. The system 100 then prompts the customer to pay the purchase of the prepaid gift account via credit card, debit card, PAYPAL account, ACH transfer, and/or another prepaid gift account.

Following receipt of payment from customer, the system 100 creates and delivers to the purchaser, or to an individual or address indicated by the purchaser, an open loop prepaid gift account for the customer in the denomination requested, and encodes such prepaid gift account on a physical card. The system 100 prints on the face of the physical card a legal name, a trade name, a logotype and/or a marketing tagline of the merchant selected by customer, as previously authorized by the merchant. In one variation, the customer selects or arranges, such as via a graphical user interface, from a list of layout or graphical options approved by the merchant. The merchant may provide a range of different types of logos, designs, themes, borders, or other variations for users to select. The merchant can provide one or more space or field on the physical card layout in to which the user can insert an uploaded or selected image, such as a personal photo. In one example, the system 100 can print the following on the physical card for Steel City Pizza: "STEEL CITY PIZZA." The legal name, trade name, logotype and/or marketing tagline of the merchant can also be printed on the card carrier and/or a customizable greeting card sent with the physical card. The prepaid gift account can be delivered via U.S. Mail or any other delivery service (such as Federal Express® or UPS®). Thus, the merchant now has a prepaid gift account product offering for its customers without incurring the expense of having to purchase additional equipment or computer software and by simply using their POS terminal to accept the open loop prepaid card.

In an alternative embodiment, in exchange for creation of the open loop prepaid gift account program, the merchant pays a prepaid gift account issuer and/or a prepaid program manager a commission equal to a percentage of the gross purchases made using the prepaid gift account at such merchant. For example, if Steel City Pizza authorized the creation of a Steel City Pizza prepaid gift account program, Steel City Pizza would pay to the prepaid gift account program manager who created the program a commission equal to ten percent (10%) of the gross amount of purchases made at Steel City Pizza with the open loop prepaid gift accounts.

In another embodiment, the merchant pays a commission to cause the merchant's name to appear first on a list of search results in response to a search by the customer for a particular type or category of merchants located in a city, state, geographic region and/or metropolitan area. For example, for a commission of five percent (5%), Steel City Pizza would appear first on the list of merchants displayed when a customer searches for a pizza restaurant located in Pittsburgh, Pennsylvania. Merchants can also offer coupons and additional discounts or rebates to customers who used the prepaid gift accounts to make purchases at such merchant. The system 100 then delivers the open loop prepaid gift account to the customer via U.S. Mail or any other delivery services, such as FEDERAL EXPRESS or UPS.

The system can track the open loop prepaid gift account, and provide an interface for the customer to manage or view the account. For example, the customer can log in through the interface and view a remaining balance of the gift account, where and when purchases were made on the gift account, and so forth. In one variation, the system provides a customer interface for the purchaser of the gift account and a recipient interface. The customer interface can provide a first subset of functionality and the recipient interface can provide a second subset of functionality. For example, the recipient interface can provide a way to view an account balance and a purchase history, where the customer interface can provide that functionality and additional information related to the creation of the gift account. The interface can be provided via a web interface, via a client application such as on a computer or smartphone, or an application programming interface (API). The system can provide notifications or alerts to the customer and/or the recipient when certain events occur in association with the open loop prepaid gift account, such as a purchase or an approaching expiration date for the gift account. The system can deliver the notifications via text message, email, automated telephone call, a message in a web interface, an entry in an event log, a physical mailed letter, and so forth. The system can further provide a merchant interface for the merchant to view one or more outstanding gift accounts, as well as view analytics data or statistics describing gift account redemption. The merchant interface can further provide a way for the merchant to send targeted reminders, promotions, advertisements, or other communications to users who purchased the gift account, or to recipients of the physical card associated with the gift account. The merchant interface can further track which graphical designs users select for printing the physical cards to determine which are more popular, as well as track redemption of cards with particular graphical designs to determine which are more likely to translate to actual sales, purchases significantly above the gift account amount, or repeat sales.

Embodiments within the scope of the present disclosure may also include tangible or non-transitory computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. Non-transitory media typically include computer readable devices such as hardward components that store data, as opposed to an air interface through which an electromagnetic signal temporarily propagates.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable customer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A method comprising:
 identifying, via processor, a request from a customer to purchase an open loop prepaid gift account;
 presenting a menu to the customer, from which the customer can select a merchant;
 receiving from the customer a selection of the merchant from the menu; and
 based on the selection:
  presenting the customer with an option to load funds onto the open loop prepaid gift account; and
  upon receipt of payment from customer, creating the open loop prepaid gift account and loading the open loop prepaid gift account with an amount of money, wherein information associated with the open loop prepaid gift account is encoded onto a physical card, and wherein merchant information is printed on the physical card according to an authorization from the merchant.

2. The method of claim 1, wherein the open loop prepaid gift account is branded by a payment network association.

3. The method of claim 1, wherein the selection of the merchant is based on at least one of a city associated with the merchant, a state associated with the merchant, a geographic region associated with the merchant, and a metropolitan area associated with the merchant.

4. The method of claim 1, wherein the merchant pays a commission to one of a prepaid gift account issuer and a program manager based on a percentage of gross purchases made by the open loop prepaid gift account at the merchant.

5. The method of claim 1, wherein the merchant pays a commission to one of a prepaid gift account issuer and a program manager for the merchant's name appearing first on a list of search results in response to a search by the customer for a particular category of merchant.

6. The method of claim 1, wherein the merchant comprises a local merchant.

7. The method of claim 1, wherein the menu comprises a list of merchants.

8. The method of claim 1, wherein the amount of money is based on a customer request.

9. The method of claim 1, wherein the merchant pays a fee to one of the prepaid gift account issuer and a program manager for the merchant's name appearing on a list of search results in response to a search by the customer for a particular category of merchant.

10. A system comprising:
 a processor; and
 a memory storing instructions which, when executed by the processor, cause the processor to perform a method comprising:
  identifying a request from a customer to purchase an open loop prepaid gift account;
  presenting a menu to the customer, from which the customer can select a merchant;
  receiving from the customer a selection of the merchant from the menu; and
  based on the selection of the merchant:
   presenting the customer with an option to load funds onto the open loop prepaid gift account; and
   upon receipt of payment from customer, creating the open loop prepaid gift account and loading the open loop prepaid gift account with an amount of money, wherein information associated with the open loop prepaid gift account is encoded onto a physical card, and wherein merchant information is printed on the physical card according to an authorization from the merchant.

11. The system of claim 10, wherein the prepaid gift account is branded by a payment network association.

12. The system of claim 10, wherein the selection of the local merchant is based on at least one of a city associated with the merchant, a state associated with the merchant, a geographic region associated with the merchant, and a metropolitan area associated with the merchant.

13. The system of claim 10, wherein the merchant pays a commission to one of a prepaid gift account issuer and a program manager based on a percentage of gross purchases made by the open loop prepaid gift account at the merchant.

14. The system of claim 10, wherein the merchant pays a commission to one of a prepaid gift account issuer and a program manager for the merchant's name appearing first on a list of search results in response to a search by the customer for a particular category of merchant.

15. The system of claim 10, wherein the merchant comprises a local merchant.

16. The system of claim 10, wherein the merchant pays a fee to one of the prepaid gift account issuer and a program manager for the merchant's name appearing on a list of search results in response to a search by the customer for a particular category of merchant.

17. A computer-readable medium having stored therein instructions which, when executed by a processor, cause the processor to perform a method comprising:
   identifying, via processor, a request from a customer to purchase an open loop prepaid gift account;
   presenting the customer with a menu from which the customer can select a merchant;
   receiving from the customer a selection of the merchant from the menu; and
   based on the selection of the merchant:
      presenting the customer with an option to load funds onto the open loop prepaid gift account; and
      upon receipt of payment from customer, creating the open loop prepaid gift account for the customer and loading the open loop prepaid gift account with an amount of money, wherein information associated with the open loop prepaid gift account is encoded onto a physical card, and wherein merchant information is printed on the physical card according to an authorization from the merchant.

18. The computer-readable medium of claim 17, wherein the prepaid gift account is branded by a payment network association.

19. The computer-readable medium of claim 17, wherein the selection of the local merchant is based on at least one of a city associated with the merchant, a state associated with the merchant, a geographic region associated with the merchant, and a metropolitan area associated with the merchant.

20. The computer-readable medium of claim 17, wherein the merchant pays a commission to one of a prepaid gift account issuer and a program manager based on a percentage of gross purchases made by the open loop prepaid gift account at the merchant.

21. The computer-readable medium of claim 17, wherein the merchant pays a commission to one of a prepaid gift account issuer and a program manager for the merchant's name appearing first on a list of search results in response to a search by the customer for a particular category of merchant.

22. The computer-readable medium of claim 17, wherein the merchant is a local merchant.

23. The computer-readable medium of claim 17, wherein the merchant pays a fee to one of the prepaid gift account issuer and a program manager for the merchant's name appearing on a list of search results in response to a search by the customer for a particular category of merchant.

* * * * *